United States Patent
Stocchi

(10) Patent No.: US 7,007,793 B2
(45) Date of Patent: Mar. 7, 2006

(54) CONTAINER TRANSFER DEVICE HAVING A VARIABLE GEOMETRY GUIDE WHEEL

(75) Inventor: Gabriele Stocchi, Le Havre Cedex (FR)

(73) Assignee: Sidel, Le Havre Cedex (FR)

(*) Notice: Subject to any disclaimer, the term of this patent is extended or adjusted under 35 U.S.C. 154(b) by 0 days.

(21) Appl. No.: 10/182,814

(22) PCT Filed: Feb. 14, 2001

(86) PCT No.: PCT/FR01/00444

§ 371 (c)(1),
(2), (4) Date: Sep. 11, 2002

(87) PCT Pub. No.: WO01/62636

PCT Pub. Date: Aug. 30, 2001

(65) Prior Publication Data

US 2003/0106779 A1    Jun. 12, 2003

(30) Foreign Application Priority Data

Feb. 21, 2000  (FR) .................................. 00 02080

(51) Int. Cl.
*B65G 29/00* (2006.01)
(52) U.S. Cl. ............................... 198/473.1; 198/803.11
(58) Field of Classification Search ............. 198/473.1, 198/803.11
See application file for complete search history.

(56) References Cited

U.S. PATENT DOCUMENTS

| 1,194,990 A | * | 8/1916 | Gaynor ..................... 198/473.1 |
| 5,613,593 A | | 3/1997 | Gerber |
| 5,826,400 A | | 10/1998 | Martin et al. |

FOREIGN PATENT DOCUMENTS

| DE | 26 23 309 A | 12/1977 |
| EP | 0 629 569 A | 12/1994 |
| JP | 61 211220 A | 9/1986 |
| WO | WO 97 45347 A | 12/1997 |

* cited by examiner

Primary Examiner—Richard Ridley

(74) Attorney, Agent, or Firm—Sughrue Mion, PLLC

(57) ABSTRACT

A device for transferring containers wherein the containers (12) are transferred on an arc-shaped path about a central axis (A1) of the transfer device (10), which device includes at least a support wheel (20) and a guide wheel (24) driven with the same rotational movement about the axis (A1) of the device, and wherein the guide wheel (24) has a periphery, cells whereof the dimensions are adapted to the dimension of the containers (12) to be transferred. The guide wheel (24) includes a device for varying the dimension of the cells so as to adapt them to the dimensions of the containers (12) to be transferred.

12 Claims, 9 Drawing Sheets

CONTAINER TRANSFER DEVICE HAVING A VARIABLE GEOMETRY GUIDE WHEEL

The invention concerns transfer devices used principally on lines for manufacturing, processing, filling and packing containers. More particularly, it concerns transfer devices in which the containers are picked up individually with a predetermined spacing or pitch.

The invention will find particular application in bottling lines, such as bottling lines for plastic bottles.

More specifically, the invention will be described in an application of transferring bottles made of polyethylene terephtalate (PET) that can be transported by the neck.

Often, on the same packaging line, it is desirable to use several types of containers that vary, particularly in their format.

In the case of PET bottles, handling the bottles by the neck is favored because bottles that have different formats but have appreciably the same neck can be handled, so that, from the point of view of supporting the bottles, no change needs to be made on the line when the format of bottles is changed. In particular, this arrangement makes it unnecessary to adjust for height.

However, in transferring containers, guide means must also be provided to ensure that the containers are held in the proper position throughout the transfer process.

Thus, a known method is to transfer PET bottles on transfer wheels driven in continuous rotational (or possibly sequential) movement around their axis. In such a transfer device, the bottles follow an arc-of-circle path between their points of loading and unloading on the wheel. All during this transfer, the bottles are subjected to various acceleration and deceleration forces, both tangential as well as radial.

When the bottles are suspended by their neck, they could become destabilized by these forces, and therefore require means to guide the bodies of the bottles.

Also, in currently known transfer devices, in addition to the wheel with recesses that supports the containers, the transfer wheels have a guide wheel. This guide wheel is generally made in the form of a plate, possibly of plastic material, the circular outer contour of which, at regular intervals corresponding to the pitch that separates the containers, has guide slots made radially toward the interior in order to immobilize the containers. Of course, in order to prevent any swaying of the containers, the shape and size of the guide slots must be adapted to the shape of the body of the containers. Although the necks of containers are often standardized, that is obviously not the case for their bodies.

Also, a change in format of bottles usually requires changing the guide plates of each of the transfer wheels on the line. This type of operation necessitates having as many sets of plates as there are different formats of bottles, and increases the shut-down time of the line during format change, which is a serious disadvantage in terms of costs.

This problem occurs not only in the case of transferring bottles suspended by their neck. It occurs generally in transferring all types of containers, including when they are supported by their bottom.

A purpose of the invention, therefore, is to propose a new design of the guide means in container transfer devices, these new means being able to be adapted very quickly to the different formats of containers to be transferred by the device.

To that end, the invention proposes a container transfer device, of the type in which the containers are transferred on a path in an arc of circle around a central axis of the transfer device, of the type in which the device has at least one support wheel and one guide wheel that are driven in the same rotational movement around the axis of the device, and of the type in which the guide wheel has, at its periphery, guide slots that are made as radial cavities with respect to an outer envelope circle of the guide wheel, and the dimensions of which are adapted to the size of the containers to be transferred, characterized in that the guide wheel has means for varying the size of the guide slots so that they can be adapted to the size of the containers to be transferred.

According to other characteristics of the invention:

the guide wheel has two superposed concentric plates, each plate being provided with a series of teeth projecting radially outward, each tooth having a left edge and a right edge, the width of each guide slot of the guide wheel being delimited by the left edge of a tooth of a first of the two plates and by the right edge of a tooth of the second of the two plates, and, by varying the relative angular position of the two plates around their axis, the width of all of the guide slots of the guide wheel is varied simultaneously;

each of the teeth of the two plates has two tensioners that are placed, one at the head of the tooth, the other at the foot of the tooth, and which are arranged along the edge of the tooth that serves to delimit a guide slot, and the guide wheel has a belt that is stretched on the tensioners so as to appreciably follow the envelope circle between two guide slots;

the belt can be extended to adapt to the variation in length of the distance delimited by the tensioners when the two plates are moved with respect to each other in order to vary the width of the guide slots;

the containers rest against the belt;

during an operation to change the width of the guide slots, the two plates are each angularly offset by the same angular value along the two opposite directions so that the overall position of the guide slots on the guide wheel does not vary;

each plate is provided with an elongated opening that extends in an arc of circle around the axis of the device, the elongated openings of the two plates being arranged so that they are axially facing each other, the elongated opening of one of the two plates is provided with a rack on its inner radial edge while the opening of the other plate is provided with a rack on its outer radial edge, and the device has a driving pinion that is engaged axially in the elongated openings in order to cooperate simultaneously on one side with the rack placed at the inner radial edge, and on the other side with the rack placed at the outer radial edge, so that the rotation of the pinion around its axis causes an angular movement of each of the two plates by the same angular value but in opposite directions around the axis of the device;

the support wheel is a wheel that is suitable for picking up the containers at their open end, and the guide wheel cooperates with the body of the containers; and the device has a second guide wheel that is designed to cooperate with the bottom of the containers, said second wheel being adjustable in height and having a funnel-shaped contact surface against which the bottom of the containers rests radially toward the exterior.

Other characteristics and advantages of the invention will appear from the detailed description that follows, as well as from the drawings in which.

Figure 1:
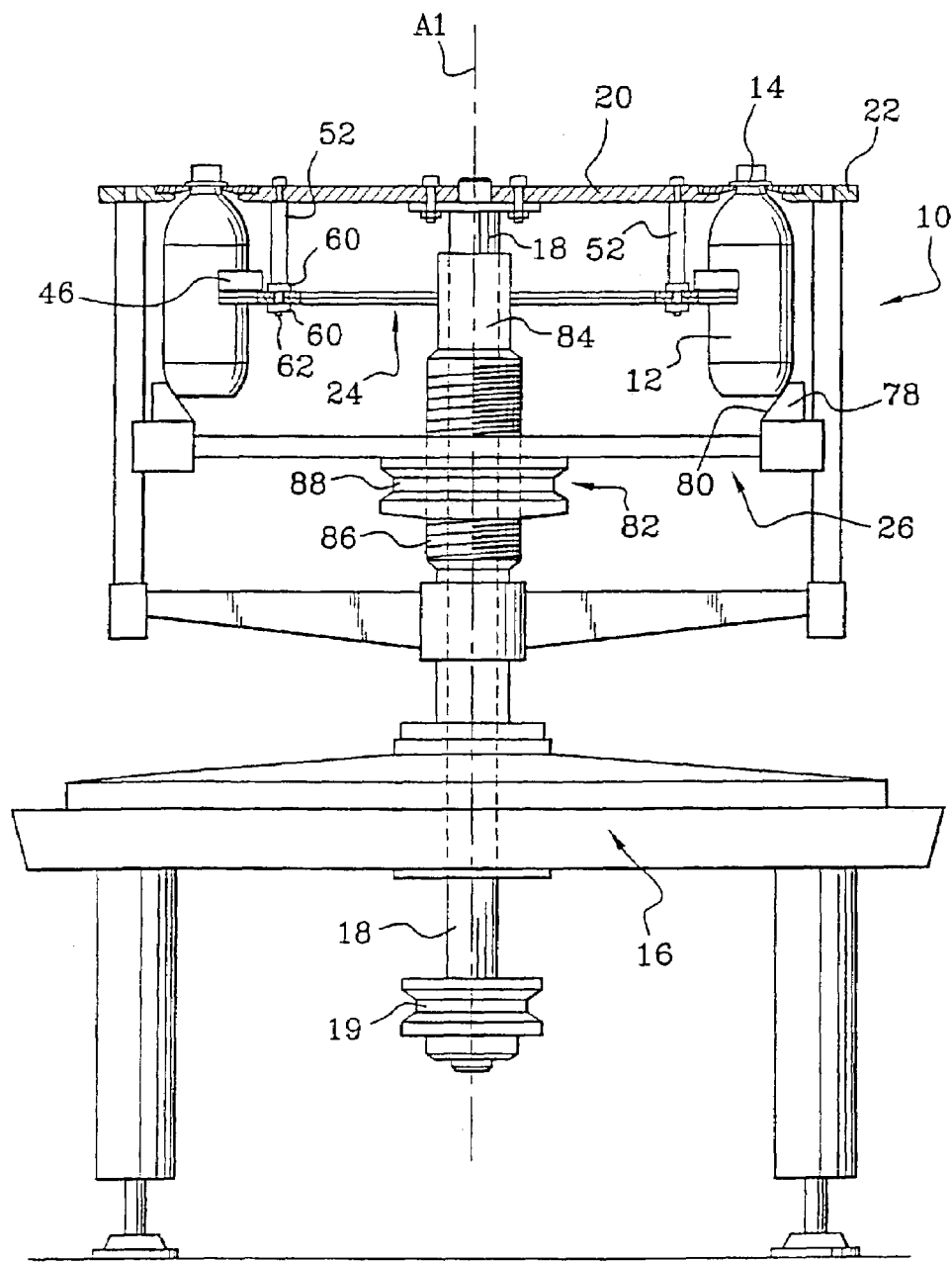
FIG. 1 is a diagrammatical view in axial cross section of a transfer device according to the principles of the invention, the device being configured to transfer a first format of bottles.
Figure 2:
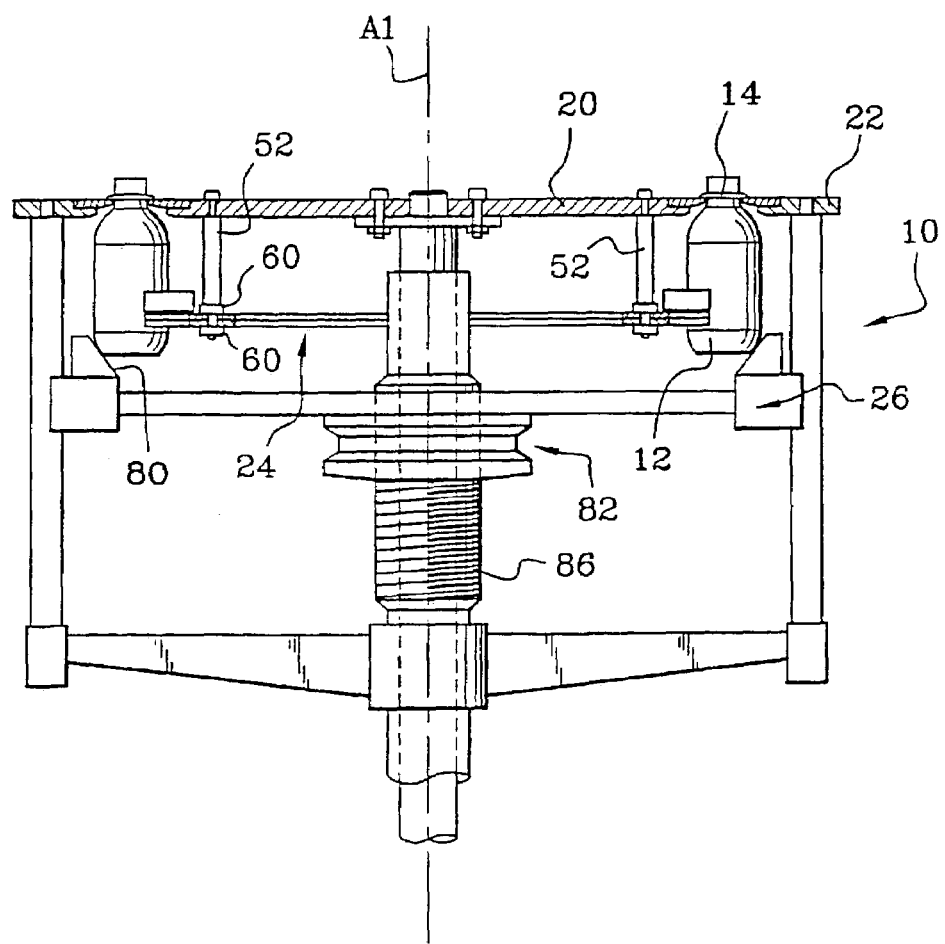
FIG. 2 is a similar view to that of FIG. 1, the device being configured to transfer a second format of bottles.

Illustrated in FIGS. 1 and 2 is a general diagrammatical view of a transfer device 10 according to the principles of the invention. In this instance, it is a transfer wheel suitable for transporting bottles 12 by their neck 14. The bottles 12 are, for example, polyethylene terephtalate (PET) bottles, the neck 14 of which has an external radial collar by which they can be supported when they are empty as well as when they are full.

The transfer wheel 10 has, mounted on a fixed table 16, a rotary carrousel with a vertical axis A1. The carrousel has a main shaft 18 that is guided in rotation around its axis A1 in a cylinder 84 and the lower end of which extends below the table 16 and has a drive pulley 19 intended to carry a belt (not represented) driven by a motor. The main shaft 18 is thus driven in continuous rotation around its axis A1. At its upper end, the shaft 18 has a support wheel 20 that is made, for example, in the form of a circular disk with an axis A1 and having semi-circular recesses of regular angular spacing provided at its periphery. The transfer wheel also has a fixed external guide 22 that extends in an arc of circle around the support wheel 20 on an arc between the points of loading and unloading of the bottles on the wheel 20. Thus, at the point of loading, the bottles 12 are taken along a path tangential to the wheel so as to be engaged by their neck in a recess of the support wheel in order to be driven in rotation by the support wheel 20. Each bottle picked up in this way is engaged radially by its neck between the support wheel 20 and the outer guide 22. The bottle is then supported by its outer radial collar on the support wheel 20 that moves it, and at the same time on the fixed guide 22 on which it slides. In every case, the bottle is held firmly by its neck and cannot be separated from its recess.

However, if the bottle were not held in some additional way, it could swing from its point of support. Consequently, the transfer wheel 10 has two additional guide units: a guide wheel 24 that cooperates with the body of the bottles and which prevents any tangential movement of the bottle, and a lower guide ring 26 which, in combination with the guide wheel 24, prevents any radial swaying of the bottles.

According to a first aspect of the invention, the guide wheel 24 is designed to be able to adapt to different formats of bottles 12, these formats differing primarily in the diameter of the body of the bottles.

In effect, the guide wheel 24 has the overall appearance of a disk with axis A1 that is integral in rotation with the support wheel 20 and which is provided, at its periphery, with guide slots 28 that are provided to receive and immobilize the body of a bottle. Of course, the guide slots 28 are made to correspond with the recesses of the support wheel 20.

Figure 3:
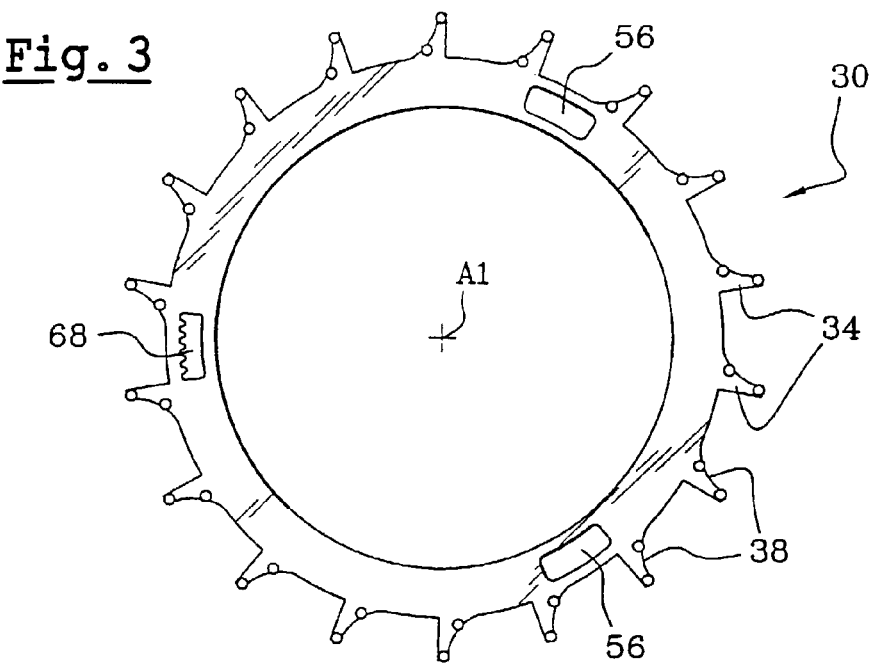
FIGS. 3 and 4 are top plan views of each of the two plates of the guide wheel.
Figure 4:
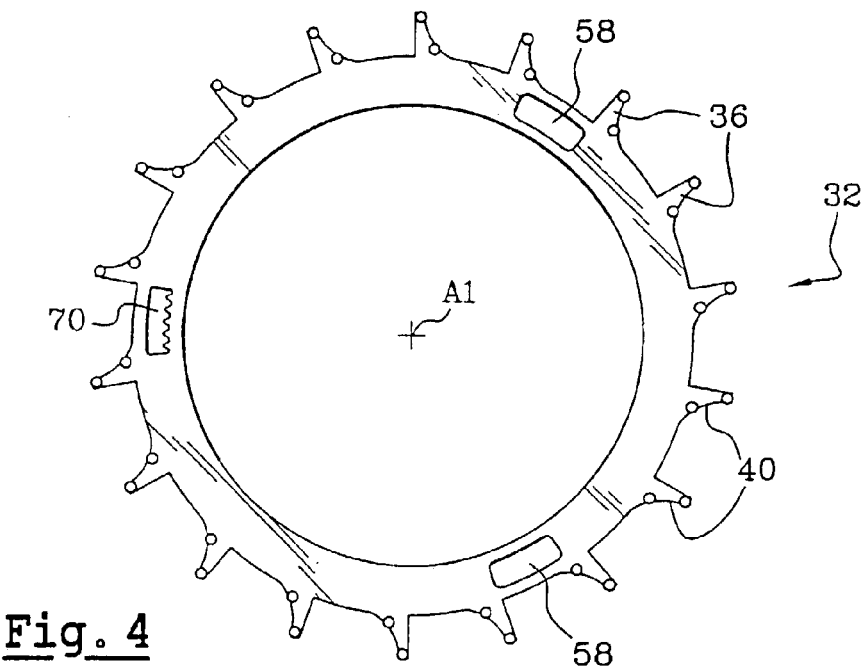

According to the invention, the guide wheel 24 is essentially formed by two superposed ring-shaped plates 30, 32 with axis A1, and as can be seen in FIGS. 3 and 4, they are provided with teeth 34, 36 that protrude radially outward. According to the invention, when the two plates 30, 32 are superposed, they delimit between their teeth 34, 36 the guide slots 28. Thus, in a top view, the width of each guide slot is delimited on one side by the left edge 38 of one tooth of the first 30 of the two plates, and on the other side, by the right edge 40 of a tooth 36 of the second 32 of the two plates. Thus, for the sake of simplicity, in the remaining text the plate 30, the teeth 34 of which delimit the guide slots by their left edge 38, will be called "left plate," and the plate 32, the teeth 36 of which delimit the guide slots 28 by their right edge 40, will be called the "right plate." The concepts of right and left concerning the edges of the teeth 34, 36 should be understood as viewed from the axis A1.

In the example illustrated, the teeth 34, 36 of the two plates are not symmetrical. Indeed, their active edge 38, 40 is curved so that there is more material at the foot of the tooth, while their other edge is appreciably rectilinear and oriented along a radius passing through the axis A1. The two plates 30, 32 are therefore not identical.

Figure 5:
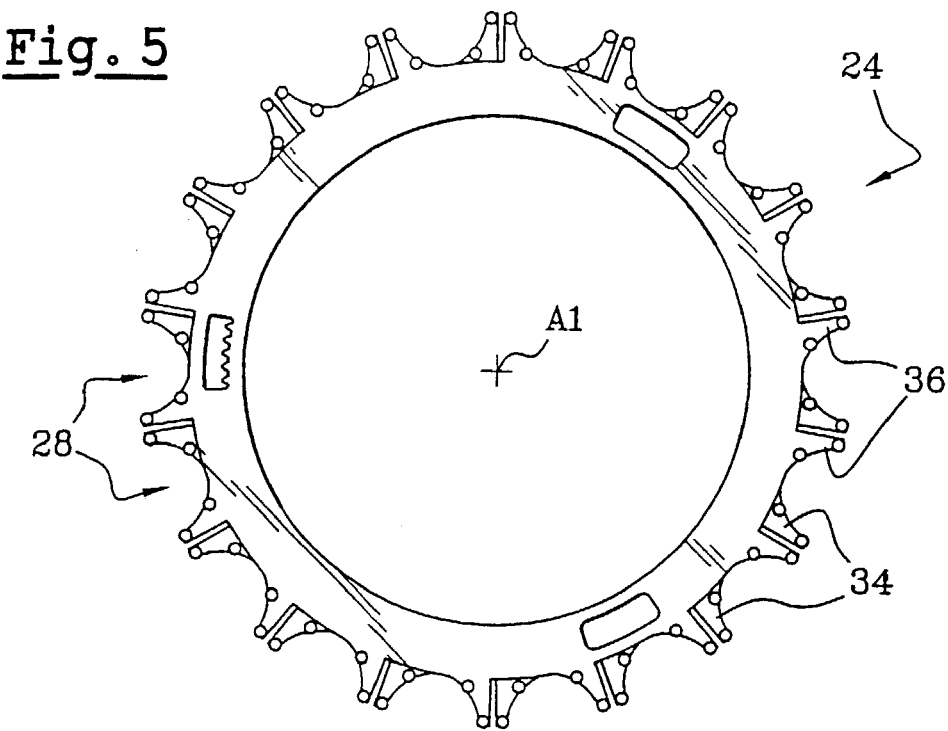
FIGS. 5 and 6 are top views of the two superposed plates, represented in two different relative angular positions.
Figure 6:
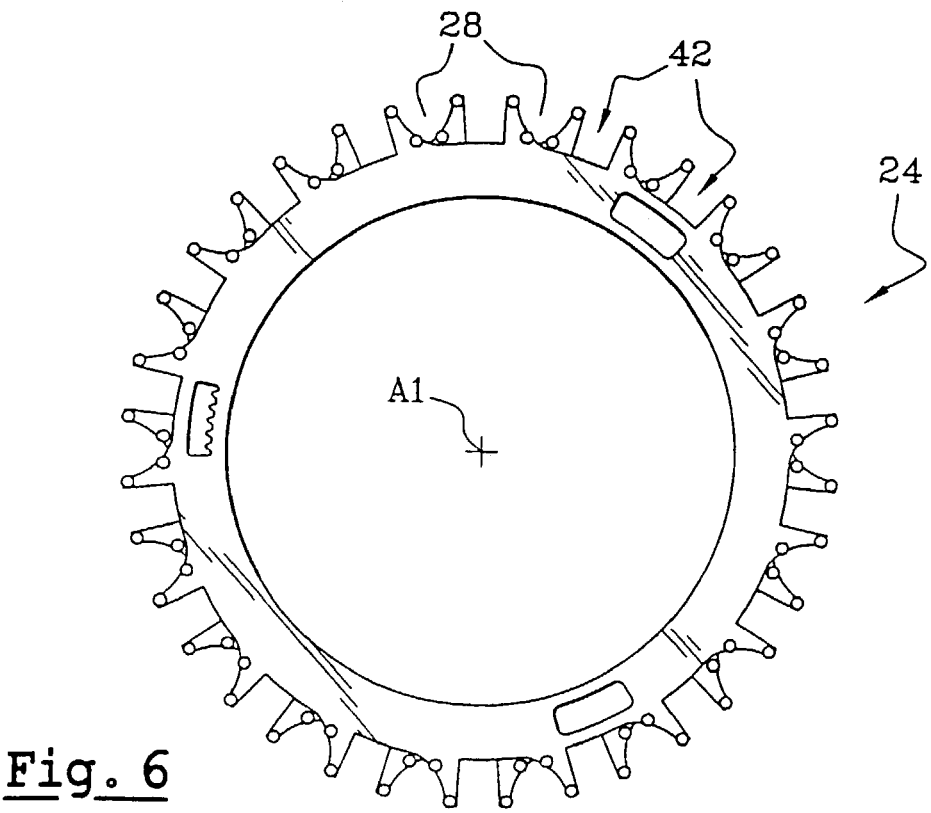

As can be seen in FIGS. 5 and 6, the width of the guide slots 28, along the tangential direction, varies as a function of the relative angular position of the two plates 30, 32. In the configuration of FIG. 6, the guide slots are narrow in width while in that of FIG. 5, the guide slots 28 are appreciably at their maximum width. The device that makes it possible to adjust the relative angular position of the two plates 30, 32 will be described further on.

Thus, with a two-plate guide wheel, the width of the guide slots 28 can easily be adapted to the size of the containers to be transferred to ensure flawless guiding.

However, under certain circumstances this type of guide wheel may not be entirely satisfactory. In effect, the width of the teeth 34, 36 at their head is limited so that the plates can be used with bottles having a wide body. However, when these same plates 30, 32 are used with small bottles, as can be seen in FIG. 6, the teeth leave relatively wide "false guide slots" 42 between the guide slots 28. Consequently, when containers are loaded on the transfer wheel 10, it could occur that the containers are significantly tilted. This risk exists in particular when the bottles are conveyed to the transfer wheel by an air conveyor. In this situation, a container can be engaged by its neck in a recess of the support wheel, but because of the tilt, its body does not become engaged in the corresponding guide slot 28 of the guide wheel 24, but on the other side of one of the teeth 34, 36 in a "false guide slot" 42. Obviously, such a situation will almost certainly result in a jam and shut-down of the facility.

According to another aspect of the invention, means are therefore provided to prevent a container from becoming engaged in a "false guide slot" 42.

To do this, each of the teeth 34, 36 has two tension rollers 44 that are placed respectively at the two ends of its active edge 38, 40, one at the head of the tooth and the other at the foot thereof. In this way, when the two plates 30, 32 are superposed, each guide slot is delimited by four tensioners 44.

Figure 7:
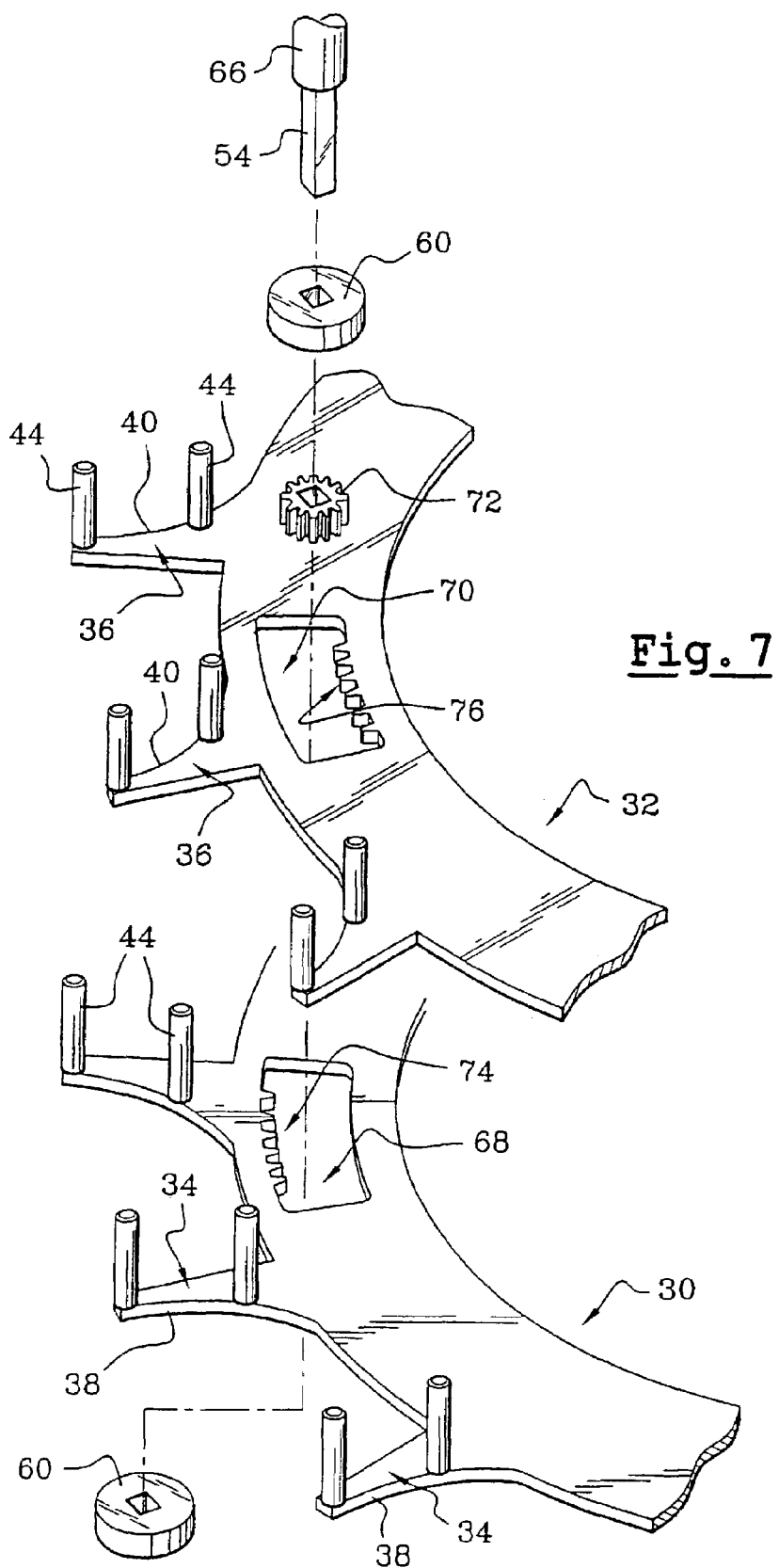
FIGS. 7, 8 and 9 are diagrammatical views in perspective illustrating the assembly of the guide wheel according to the invention.
Figure 8:
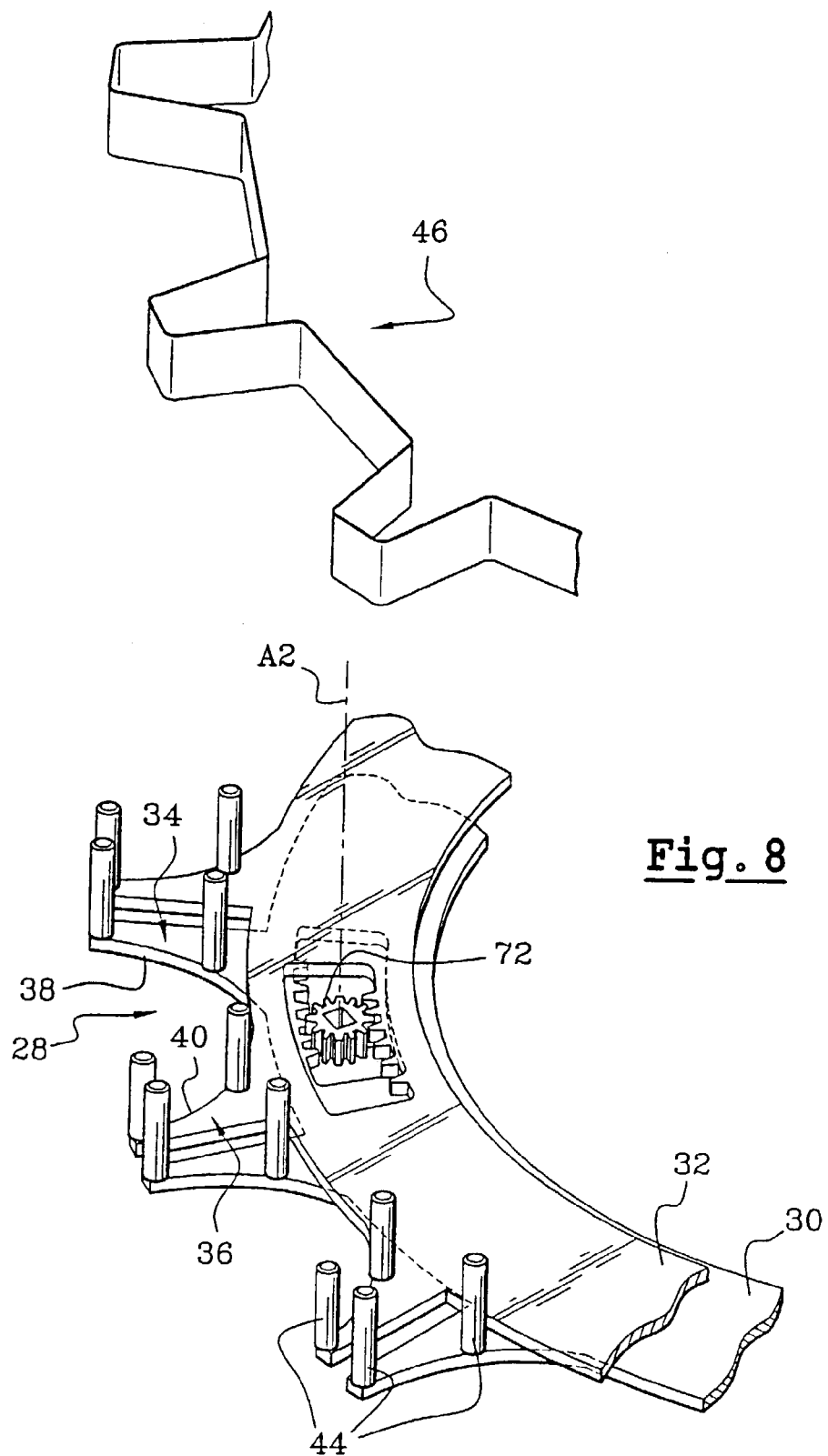
Figure 9:
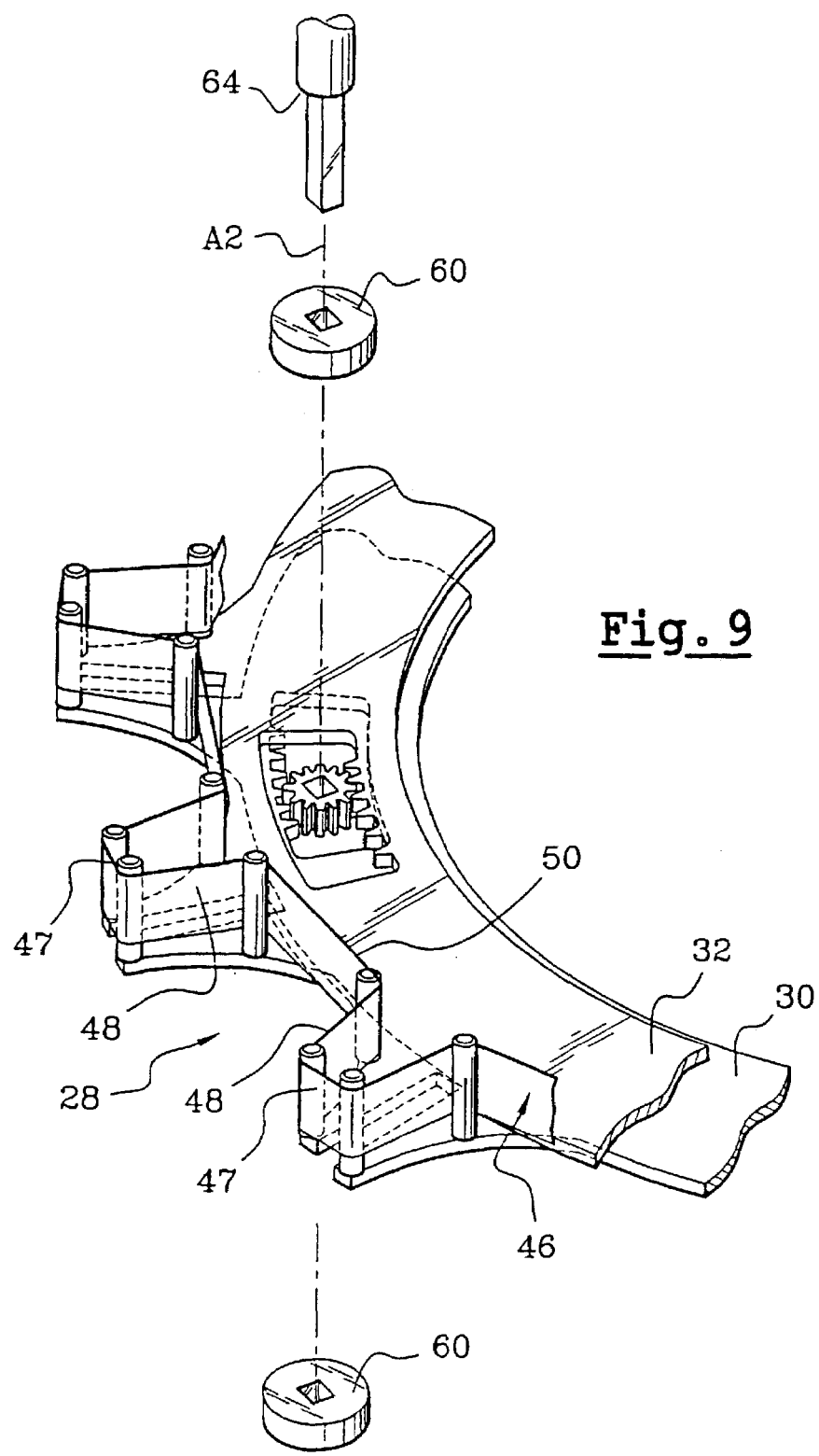

As shown in FIGS. 7 to 9, the tensioners are made in the form of cylindrical rods with axis parallel to the axis of the plates. In the example illustrated, the tensioners 44 are oriented vertically upward, and preferably the tensioners 44 that are attached to the lower plate are longer than those attached to the upper plate so that the tensioners reach appreciably the same level.

These tensioners are provided to allow a belt 46 to be wound on around the guide wheel. The belt 46 is wound on radially toward the outside of the tensioners located at the head of the teeth and toward the inside on the tensioners located at the feet of the teeth. In this way, between each guide slot, the belt 46 appreciably follows the envelope circle of the teeth 34, 36 (in fact, between two teeth, of one rectilinear head segment 47 connecting two tooth-head tensioners), and at each guide slot, the belt 46 appreciably follows the profile of the guide slot. In reality, at each guide slot, the belt forms a pseudo-guide slot with two lateral segments 48 that appreciably correspond with the two lateral edges 38, 40 of the guide slot 28, and between two lateral segments, with a bottom segment 50 that is appreciably tangent to the circle at the foot of the teeth 34, 36.

Figure 10:
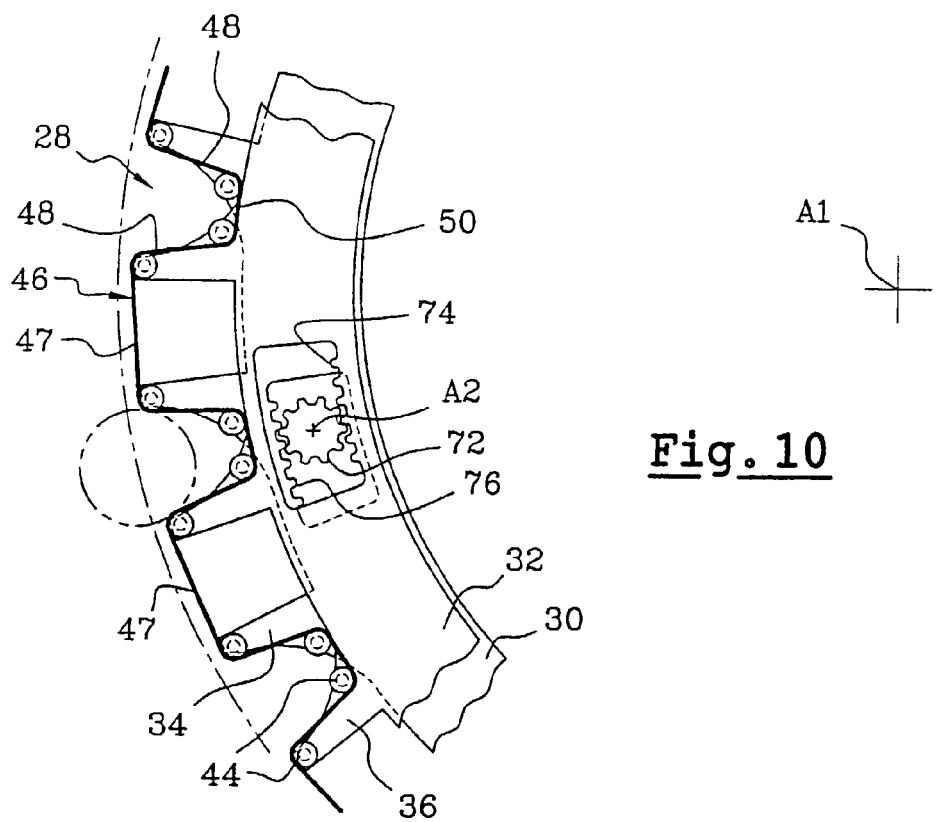
FIGS. 10 and 11 are partial top views illustrating two possible configurations of the guide wheel.
Figure 11:
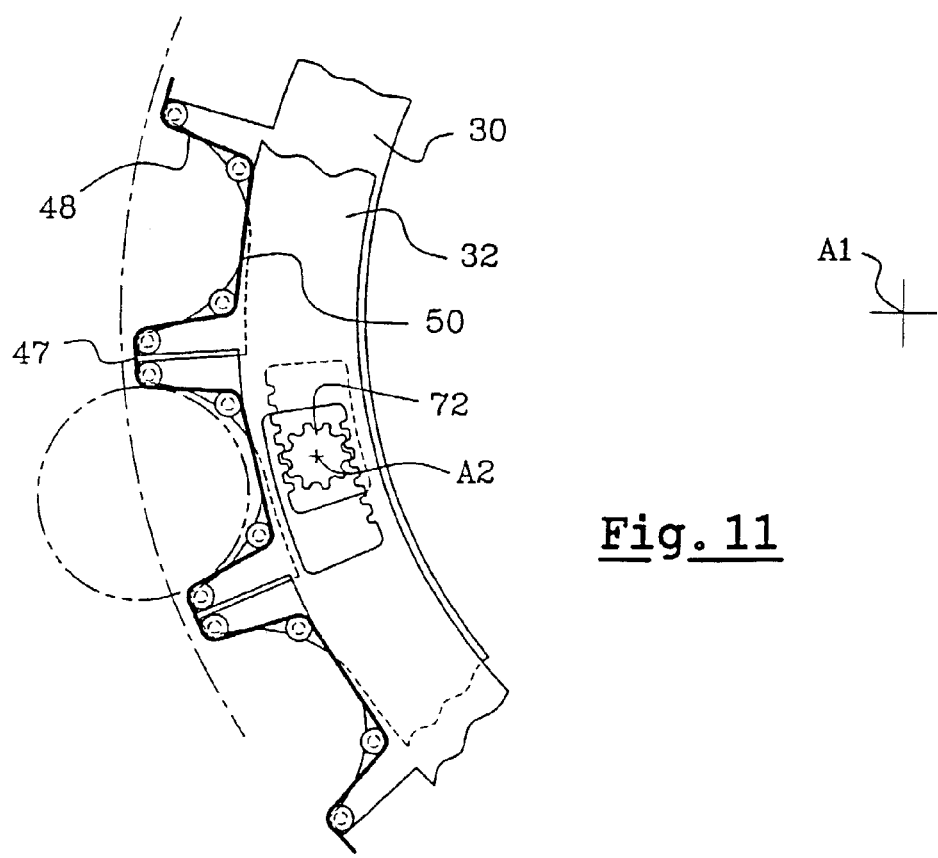

When the plates are moved angularly with respect to each other, as illustrated in FIGS. 10 and 11, the two teeth 34, 36 that delimit a guide slot 28 tend to separate from each other, which tends to increase the size of the bottom segment 50 of the pseudo-guide slot delimited by the belt 46. However, at the same time, each of these two teeth is approached respectively by the teeth that delimit the adjacent guide slots. The result is that the length of the head segment 47 of the belt decreases. Depending on the precise geometry of the positioning of the tensioners, the total length of the belt 46 may vary somewhat if the decrease in the head segments 47 does not exactly compensate for the increase of the foot segments 50 of the belt. Also, it is preferable to use a belt that has a certain stretching capacity, such as a polyurethane belt.

Preferably, as illustrated in FIGS. 10 and 11, the exact position and diameter of the head tensioners will be chosen so that the lateral segments of the belt 46 extend partially "in the open," beyond the impression of the teeth. In this way, rather than coming directly in contact with the plates 30, 32, the containers will rest on the belt 46, which limits the risks of damage to the containers.

Preferably, the tensioners at the feet of the teeth are arranged so that the lateral segments 48 of a given recess are not parallel to each other, but have a V shape open radially outward. Thus, in the two examples illustrated in which the containers are cylindrical, it will be noted that the adjustment of the plates is chosen so that the bottle rests on only two points on the guide wheel: on the lateral segments 48 of the belt 46.

To control the rotation of the two plates 30, 32, a device is provided that makes it possible to pivot both plates simultaneously by the same angular value, but in opposite directions around the axis A1. Thus, during the dimensional adaptation of the guide slots 28, they all remain immobile with respect to the recesses of the support wheel 20.

Figure 12:
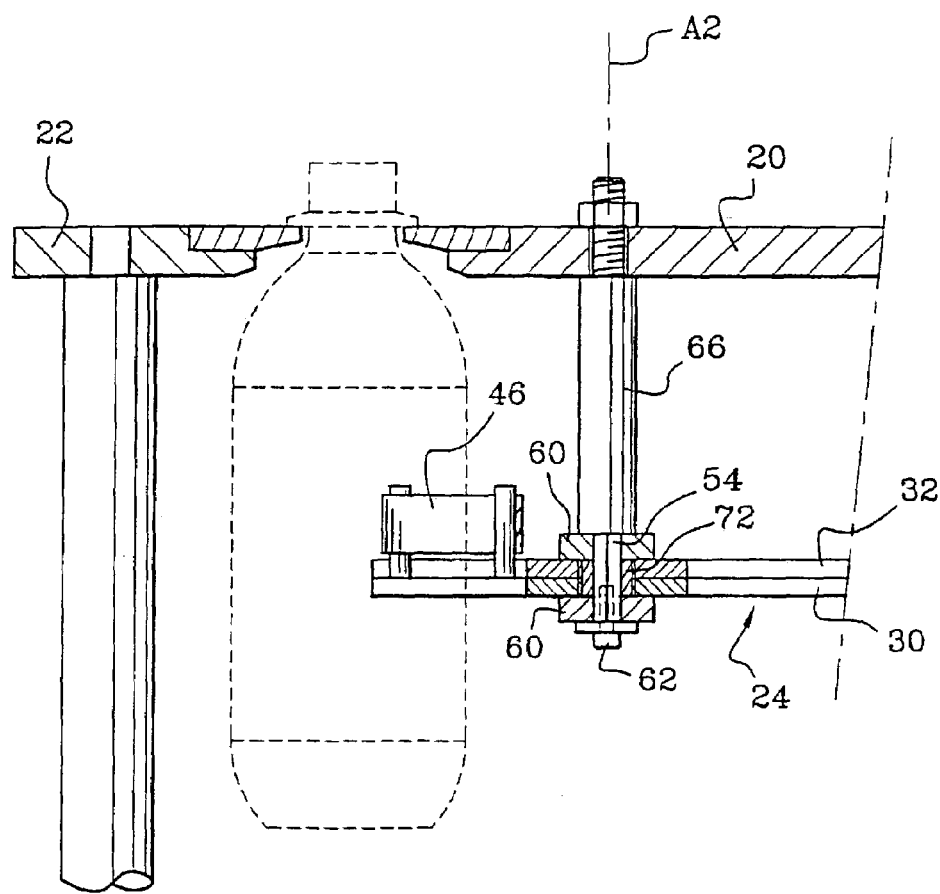
FIG. 12 is a larger scale partial view of FIG. 1 illustrating in more detail the means of attaching the guide wheel to the support wheel.

As illustrated in FIGS. 1 and 12, the guide wheel is suspended below the support wheel 20 by means of three columns that are attached by their upper end to the support wheel 20. In the example illustrated, two suspension columns 52 and one control column 66 can be distinguished.

At their lower end, the columns 52, 66 have a section 54 of smaller diameter that extends axially through the corresponding openings 56, 58, 68, 70 in the two plates 30, 32. The openings 56, 58, 68, 70 are made in an arc of circle around the axis A1 and are therefore appreciably bean shaped.

For the suspension columns 52, the diameter of the sections 54 corresponds appreciably to the width of the corresponding openings 56, 58. Two washers 60 are mounted on the section 54 on either side of the two plates 30, 32, and a screw 62 is screwed into the lower end of the section 54 so as axially to retain the lower washer 60. Of course, the washers 60 have a diameter that is greater than the width of the openings 56, 58. Thus, the stack formed by the lower washer, the plates 30, 32 and the upper washer is axially held between the screw 62 and a shoulder 64 that delimits the upper part of the section 54. However, a slight axial play is left to allow the plates to pivot around the axis A1.

With respect to the third control column 66, illustrated more particularly in FIGS. 7 to 9, its end section is prismatic in cross section in order to drive in rotation a pinion 72, the height of which corresponds appreciably to the aggregate thickness of the two plates. The pinion 72 is intended to be received in the openings 68, 70 of the two plates 30, 32. As illustrated in FIG. 7, the opening 68 in the plate 30 has an outer radial edge with teeth to form a first rack 74. The opening 70 in the plate 32 has an inner radial edge that forms a second rack 76.

When the pinion 72 is received in the openings as illustrated in FIGS. 8 and 9, it cooperates on one side with the first rack 74 to drive one of the plates in one direction of rotation, and simultaneously on the other side with the second rack 76 to drive the other plate 32 in the opposite direction.

By this device, the control column 66 can be driven in rotation around its axis A2, either manually with the aid of a wrench, or by means of a motor, in order to cause the rotation of the pinion 72 around its axis. Because the column is attached by its upper end to the support wheel with only one possibility of rotation around its axis A2, the pinion remains completely immobile with respect to the support wheel. Also, when the pinion 72 is made to rotate by a specific angle around its axis A2, it drives in rotation the two plates 30, 32 around their axis A1, by means of the two racks 74, 76. In this case, the slewing angle of the two plates is identical, but the slewing is in opposite directions around the axis A1.

Because of this design of the drive device, with the two plates turning by the same angle, the guide slots become larger or smaller with no movement of the central plane, so that said central plane remains in line with the recesses of the support wheel without the need for taking special alignment precautions when formats are changed.

The control column 52 also has the function of suspension of the plates since the pinion 72 is held between two washers 60 that are of a greater diameter than the width of the openings 68, 70 and are axially held between an upper shoulder of the column 66 and a screw 62.

Because the three columns 52, 66 are arranged appreciably 120 degrees from each other around the axis A1, the guide wheel 24 is held perfectly-in place with respect to the support wheel, the plates not being able to move other than in rotation around the axis A1. Of course, this possibility of rotation around the axis A1 is prevented whenever the pinion 72 is immobilized in rotation around its axis A2.

Thus, with a guide wheel 24 according to the invention, the containers are perfectly held radially inward and tangentially with respect to the axis A1.

However, in the transfer device described here, the guide wheel 24 is not intended to grip the containers, although this would be possible by an appropriate design of the guide slots 28. Also, in the example illustrated, a lower guide ring 26 is provided to cooperate with the bottom of the containers in order to prevent them from moving radially outward. To do this, the lower wheel 26 has a ring 78 that has a conical contact surface 80 that widens out at the top like a funnel. Of course, the ring 78 does not extend for a full circle, but only along an arc of circle that corresponds to the arc of circle on which the upper guide 22 extends and which corresponds to the path of the containers on the device.

The height of the guide wheel 26 can be adjusted so that the contact surface 80 provides support for the bottom of the containers. In this way, as a result of the taper of the contact surface 80, the ring 78 can be adapted, simply by adjusting the height, to any bottle diameter and any shape of bottle bottom.

The height adjustment of the lower wheel 26 is very simple. In effect, the wheel 26 is mounted by a central hub 82 on the axial cylinder 84 inside which the main shaft 18 is guided. The cylinder 84 is fixed and integral with the frame of the machine. Its outer surface has threading 86 on which the hub 82 is screwed. The hub 82 also has a pulley 88 on which a belt (not represented) can be wound in order to drive it in rotation. Thus, by controlling the rotation of the hub, the lower wheel 26 assembly can be moved vertically along the threading 86.

The hub 82 can rotate freely with respect to the ring 78 so that the height adjustment of the lower wheel 26 has no influence on the angular position of the ring 78. It will be noted that the ring 78 is fixed while the transfer device is in operation. Also, it is preferable that the contact surface 80 be made of a material with a low coefficient of friction so as not to scratch the bottom of the containers that will rub against this surface during their transfer on the device 10.

The drive belt can be driven directly by an electric motor dedicated specifically for the height adjustment of the lower wheel 26 of this device. However, in a facility that has several transfer devices that are similar to the one just described, a single motor can be used for the height adjustment of all of the lower guide wheels. The different hubs will then be driven either by a set of tandem belts, or by a single belt, the path of which winds around several hubs.

The transfer device according to the invention is therefore particularly advantageous because of the ease of adjustment of the container guide means, said adjustment thus ensuring a high degree of reliability of the transfer with a minimum number of incidents.

What is claimed is:

1. A container transfer device, of the type in which the containers (12) are transferred on a path in an arc of circle around a central axis (A1) of the transfer device (10), of the type in which the device has at least one support wheel (20) and one guide wheel (24) that are driven in the same rotational movement around the axis (A1) of the device, and of the type in which the guide wheel (24) has, at its periphery, guide slots (28) that are made as radial cavities with respect to an outer envelope circle of the guide wheel (24), and the dimensions of which are adapted to the size of the containers (12) to be transferred, wherein:
   the guide wheel (24) has means for varying the size of the guide slots (28) so that they can be adapted to the size of the containers (12) to be transferred; and
   the guide wheel (24) has means for preventing the containers from being inserted into false guide slots (42) arranged between the guide slots (28),
   wherein the guide wheel (24) has two superposed concentric plates (30, 32), each plate being provided with a series of teeth (34, 36) projecting radially outward, each tooth (34, 36) having a left edge and a right edge, in that the width of each guide slot (28) of the guide wheel (24) is delimited by the left edge (38) of a tooth (34) of a first (30) of the two plates and by the right edge (40) of a tooth (36) of the second (32) of the two plates, and in that, by varying the relative angular position of the two plates (30, 32) around their axis (A1), the width of all of the guide slots (28) of the guide wheel (24) is varied simultaneously, and
   wherein each of the teeth (34, 36) of the two plates (30, 32) has two tensioners (44) that are placed, one at the head of the tooth, the other at the foot of the tooth, and which are arranged along the edge (38, 40) of the tooth that serves to delimit a guide slot (28), and in that the guide wheel (24) has a belt (46) that is stretched on the tensioners (44) so as to appreciably follow the envelope circle between two guide slots (28).

2. The transfer device according to claim 1, wherein the belt (46) can be extended to adapt to the variation in length of the distance delimited by the tensioners (44) when the two plates (30, 32) are moved with respect to each other in order to vary the width of the guide slots (28).

3. The transfer device according to claim 1, wherein the containers (12) rest against the belt (46).

4. The transfer device according to claim 1, wherein, during an operation to change the width of the guide slots (28), the two plates (30, 32) are each angularly offset by the same angular value along the two opposite directions so that the overall position of the guide slots (28) on the guide wheel (24) does not vary.

5. The transfer device according to claim 4, wherein each plate (30, 32) is provided with an elongated opening (68, 70) that extends in an arc of circle around the axis (A1) of the device, the elongated openings (68, 70) of the two plates being arranged so that they are axially facing each other, in that the elongated opening (70) of one of the two plates is provided with a rack (76) on its inner radial edge while the elongated opening (68) of the other plate is provided with a rack (74) on its outer radial edge, and in that the device has a driving pinion (72) that is engaged axially in the elongated openings (68, 70) in order to cooperate simultaneously on one side with the rack (76) placed at the inner radial edge, and on the other side with the rack (74) placed at the outer radial edge, so that the rotation of the pinion (72) around its axis (A2) causes an angular movement of each of the two plates (30, 32) by the same angular value but in opposite directions around the axis (A1) of the device (10).

6. A container transfer device of the type in which the containers (12) are transferred on a path in an arc of circle around a central axis (A1) of the transfer device (10), of the type in which the device has at least one support wheel (20) and one guide wheel (24) that are driven in the same rotational movement around the axis (A1) of the device, and of the type in which the guide wheel (24) has, at its periphery, guide slots (28) that are made as radial cavities with respect to an outer envelope circle of the guide wheel (24), and the dimensions of which are adapted to the size of the containers (12) to be transferred, wherein:
   the guide wheel (24) has means for varying the size of the guide slots (28) so that they can be adapted to the size of the containers (12) to be transferred; and
   the guide wheel (24) has means for preventing the containers from being inserted into false guide slots (42) arranged between the guide slots (28),
   wherein the support wheel (20) is a wheel that is suitable for picking up the containers (12) at their open end (14), and in that the guide wheel (24) cooperates with the body of the containers, and
   further comprising a second guide wheel (26) that is designed to cooperate with the bottom of the containers (12), and in that said second wheel (26) is adjustable in height and has a funnel-shaped contact surface against which the bottom of the containers (12) rests radially toward the exterior.

7. A container transfer device, of the type in which the containers (12) are transferred on a path in an arc of circle around a central axis (A1) of the transfer device (10), of the type in which the device has at least one support wheel (20) and one guide wheel (24) that are driven in the same rotational movement around the axis (A1) of the device, and of the type in which the guide wheel (24) has, at its periphery, guide slots (28) that are made as radial cavities with respect to an outer envelope circle of the guide wheel (24), and the dimensions of which are adapted to the size of the containers (12) to be transferred, wherein:
  the guide wheel (24) has means for varying the size of the guide slots (28) so that they can be adapted to the size of the containers (12) to be transferred;
  the guide wheel (24) has two superposed concentric plates (30, 32), each plate being provided with a series of teeth (34, 36) projecting radially outward, each tooth (34, 36) having a left edge and a right edge, in that the width of each guide slot (28) of the guide wheel (24) is delimited by the left edge (38) of a tooth (34) of a first (30) of the two plates and by the right edge (40) of a tooth (36) of the second (32) of the two plates, and in that, by varying the relative angular position of the two plates (30, 32) around their axis (A1), the width of all of the guide slots (28) of the guide wheel (24) is varied simultaneously; and
  each of the teeth (34, 36) of the two plates (30, 32) has two tensioners (44) that are placed, one at the head of the tooth, the other at the foot of the tooth, and which are arranged along the edge (38, 40) of the tooth that serves to delimit a guide slot (28), and in that the guide wheel (24) has a belt (46) that is stretched on the tensioners (44) so as to appreciably follow the envelope circle between two guide slots (28).

8. The transfer device according to claim 7, wherein the belt (46) can be extended to adapt to the variation in length of the distance delimited by the tensioners (44) when the two plates (30, 32) are moved with respect to each other in order to vary the width of the guide slots (28).

9. The transfer device according to claim 7, wherein the containers (12) rest against the belt (46).

10. The transfer device according to claim 7, wherein, during an operation to change the width of the guide slots (28), the two plates (30, 32) are each angularly offset by the same angular value along the two opposite directions so that the overall position of the guide slots (28) on the guide wheel (24) does not vary.

11. The transfer device according to claim 10, wherein each plate (30, 32) is provided with an elongated opening (68, 70) that extends in an arc of circle around the axis (A1) of the device, the elongated openings (68, 70) of the two plates being arranged so that they are axially facing each other, in that the elongated opening (70) of one of the two plates is provided with a rack (76) on its inner radial edge while the elongated opening (68) of the other plate is provided with a rack (74) on its outer radial edge, and in that the device has a driving pinion (72) that is engaged axially in the elongated openings (68, 70) in order to cooperate simultaneously on one side with the rack (76) placed at the inner radial edge, and on the other side with the rack (74) placed at the outer radial edge, so that the rotation of the pinion (72) around its axis (A2) causes an angular movement of each of the two plates (30, 32) by the same angular value but in opposite directions around the axis (A1) of the device (10).

12. A container transfer device, of the type in which the containers (12) are transferred on a path in an arc of circle around a central axis (A1) of the transfer device (10), of the type in which the device has at least one support wheel (20) and one guide wheel (24) that are driven in the same rotational movement around the axis (A1) of the device, and of the type in which the guide wheel (24) has, at its periphery, guide slots (28) that are made as radial cavities with respect to an outer envelope circle of the guide wheel (24), and the dimensions of which are adapted to the size of the containers (12) to be transferred, wherein:
  the guide wheel (24) has means for varying the size of the guide slots (28) so that they can be adapted to the size of the containers (12) to be transferred;
  the support wheel (20) is a wheel that is suitable for picking up the containers (12) at their open end (14), and in that the guide wheel (24) cooperates with the body of the containers; and
  the transfer device further comprises a second guide wheel (26) that is designed to cooperate with the bottom of the containers (12), and in that said second wheel (26) is adjustable in height and has a funnel-shaped contact surface against which the bottom of the containers (12) rests radially toward the exterior.

* * * * *